United States Patent
Itaya et al.

(10) Patent No.: US 11,368,938 B2
(45) Date of Patent: Jun. 21, 2022

(54) WIRELESS COMMUNICATION SYSTEM AND WIRELESS COMMUNICATION METHOD

(71) Applicant: NATIONAL INSTITUTE OF INFORMATION AND COMMUNICATIONS TECHNOLOGY, Koganei (JP)

(72) Inventors: Satoko Itaya, Tokyo (JP); Kenichi Maruhashi, Tokyo (JP); Fumiko Ohori, Tokyo (JP); Fumihide Kojima, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 78 days.

(21) Appl. No.: 16/820,813

(22) Filed: Mar. 17, 2020

(65) Prior Publication Data

US 2020/0314831 A1   Oct. 1, 2020

(30) Foreign Application Priority Data

Mar. 29, 2019  (JP) ............................ JP2019-069086

(51) Int. Cl.
*H04W 72/04*   (2009.01)
*H04W 24/02*   (2009.01)
(Continued)

(52) U.S. Cl.
CPC ....... *H04W 72/0406* (2013.01); *H04W 24/02* (2013.01); *H04W 28/20* (2013.01); *H04W 72/1247* (2013.01); *H04W 74/0833* (2013.01)

(58) Field of Classification Search
CPC ............. H04W 72/0406; H04W 24/02; H04W 28/20; H04W 72/1247; H04W 74/0833;
(Continued)

(56) References Cited

U.S. PATENT DOCUMENTS

| | | |
|---|---|---|
| 7,948,891 B2 | 5/2011 | Takeda et al. |
| 10,244,371 B2 | 3/2019 | Duval et al. |
| 2007/0110102 A1 | 5/2007 | Yagyuu et al. |

(Continued)

FOREIGN PATENT DOCUMENTS

| | | |
|---|---|---|
| JP | 2001258070 A | 9/2001 |
| JP | 2005130174 A | 5/2005 |

(Continued)

OTHER PUBLICATIONS

Understanding How Routing Updates and Layer 2 Control Packets Are Queued on an Interface with a QoS Service Policy, Document ID: 18664, Cisco System, Feb. 15, 2008. (Year: 2008).*

(Continued)

*Primary Examiner* — Hassan A Phillips
*Assistant Examiner* — Mohammed S Chowdhury
(74) *Attorney, Agent, or Firm* — Holtz, Holtz & Volek PC (57) ABSTRACT

To provide a wireless communication system that can implement optimal communication conditions depending on the type of data. A wireless communication system 100 for transmitting and receiving data to and from a plurality of terminals 2 for use in a narrow space includes normal transmitting/receiving means for transmitting and receiving normal data, among the data, to and from a terminal 2, based on priorities assigned to each of a plurality of buffers stored in a base station 1, and urgent transmitting/receiving means for assigning a high priority to a buffer storing a lowest amount of data among the plurality of buffers, and transmitting and receiving urgent data, among the data, which is (Continued)

different from the normal data, to and from the terminal, via the buffer to which the high priority is assigned.

4 Claims, 7 Drawing Sheets

(51) Int. Cl.
*H04W 28/20* (2009.01)
*H04W 72/12* (2009.01)
*H04W 74/08* (2009.01)

(58) Field of Classification Search
CPC ............. H04W 28/0268; H04W 88/08; H04W 72/0446; H04W 72/0453; H04W 72/10; H04W 52/28; H04W 72/1242; H04L 47/28; H04L 47/30; H04L 47/6275; H04L 1/1607; H04L 47/2433; H04L 47/6215; H04L 47/6285; H04L 47/6295; H04B 1/40
See application file for complete search history.

(56) References Cited

U.S. PATENT DOCUMENTS

| | | | | |
|---|---|---|---|---|
| 2008/0285578 A1* | 11/2008 | DeLay | ................... | G06F 9/546 370/412 |
| 2010/0285756 A1* | 11/2010 | Nakazawa | .............. | H04L 47/10 455/69 |
| 2014/0254370 A1 | 9/2014 | Kakadia et al. | | |
| 2016/0371225 A1* | 12/2016 | Denz | ....................... | H04L 49/90 |
| 2017/0279725 A1* | 9/2017 | Lee | ....................... | H04L 5/0055 |
| 2018/0048691 A1* | 2/2018 | Pruden | ................ | H04L 47/2433 |

FOREIGN PATENT DOCUMENTS

| | | | |
|---|---|---|---|
| JP | 2006311495 A | 11/2006 | |
| JP | 2007142612 A | 6/2007 | |
| JP | 2007251655 A | 9/2007 | |
| JP | 2008270931 A | 11/2008 | |
| JP | 2011111562 A | 6/2011 | |
| JP | 2012015899 A | 1/2012 | |
| JP | 2017518698 A | 7/2017 | |

OTHER PUBLICATIONS

Japanese Office Action (and English language translation thereof) dated Mar. 9, 2021 issued in Japanese Application No. 2019-069086.

Extended European Search Report (EESR) dated Jul. 30, 2020 issued in European Application No. 20163672.7.

* cited by examiner

WIRELESS COMMUNICATION SYSTEM AND WIRELESS COMMUNICATION METHOD

BACKGROUND OF THE INVENTION

Field of the Invention

The present invention relates to a wireless communication system and a wireless communication method for transmitting and receiving data to and from a plurality of terminals that are for use in a narrow space.

Description of the Related Art

Conventionally for example, the wireless communication systems disclosed in Patent Literature 1 to 5 have been proposed as wireless communication technologies.

Patent Literature 1 discloses, for example, a wireless communication method for performing wireless communication by reserving the communication bandwidth that is needed for wireless communication, based on bandwidth reservation information for isochronous communication, which arrives from a variety of devices connected via high-speed serial buses.

As disclosed in Patent Literature 2, a wireless base station includes an antenna, a transmission/receipt switching unit, a receiving unit, a packet analyzing unit, a terminal station management unit, a packet generation unit, a packet control unit, and a transmitting unit, and a wireless terminal station includes an antenna, a transmission/receipt switching unit, a receiving unit, a packet analyzing unit, a channel measurement control unit, a packet generation unit, and a transmitting unit for transmitting packets. According to the technology disclosed in Patent Literature 2, the order of wireless terminal stations to perform packet switching with a wireless base station is changed per band-reserved period, and each wireless terminal station can perform other processes (for example, channel measurement) during the time that is left in each band-reserved period after packet switching is performed, so that it is possible to perform packet switching with the wireless base station without causing a deterioration of the quality of communication.

According to the technology disclosed in Patent Literature 3, a communication terminal in bandwidth-guaranteed communication sends a slot allocation request for three hops, to a slot allocation server. Since unique slots are allocated by the slot allocation server and used within a network, other communication terminals do not interfere with these slots. A transmitting terminal places information about the slots in an option header and transmits a packet. A transfer terminal to transfer the packet determines the transmitting slot, when transferring the packet, based on the slot information in the option header and its own hop count.

According to the technology disclosed in Patent Literature 4, when a bandwidth-guaranteed wireless communication service is started between a wireless terminal and a PNC, the PNC issues a bandwidth reservation request to the PNCs of neighboring areas via a cable network. The PNCs, receiving the bandwidth reservation request, reserve the bandwidth required for the bandwidth-guaranteed wireless communication service to be provided to the wireless terminal, in response to the bandwidth reservation request. When the wireless terminal moves across areas, the wireless terminal's connecting PNC is changed on a dynamic basis.

With the technology disclosed in Patent Literature 5, a wireless base station includes a scheduler unit that transmits a bandwidth reservation frame for reporting the period where data transmission/receipt is assigned, to wireless base stations that are subject to data transmission/receipt, and reporting the period where data transmission is prohibited, to wireless terminal stations that are not subject to data transmission/receipt, a frame analyzing unit that determines whether or not to perform retransmission control based on the receiving result of a terminal station data frame and the number of retransmission controls, a retransmitting control unit that commands the scheduler unit to transmit a bandwidth reservation frame when it is decided to perform retransmission control, and an access control unit that transmits data to a wireless base station during the period included in the bandwidth reservation frame and allocated to the subject base station, when a wireless terminal station is a wireless terminal station for data transmission/receipt.

The contents of Japanese Unexamined Patent Application Publication No. 2001-111562, Japanese Unexamined Patent Application Publication No. 2005-130174, Japanese Unexamined Patent Application Publication No. 2007-142612, Japanese Unexamined Patent Application Publication No. 2007-251655, and Japanese Unexamined Patent Application Publication No. 2012-15899 are incorporated herein by reference in their entirety.

SUMMARY OF THE INVENTION

Problems To be Solved by the Invention

Now, in recent years, technology for making it possible to transmit and receive information such as control data for terminals, by wireless communication, to and from terminals such as manufacturing apparatus or transport apparatus that are for use in narrow spaces such as manufacturing sites, are expected. In order to transmit and receive such information, stable communication conditions are required for stable operations of manufacturing lines and/or the like.

In particular, when wireless communication technology is used on manufacturing sites, cases might occur where highly urgent data is produced unexpectedly and transmitted and received, in addition to data that is transmitted and received at normal times. The time for transmitting/receiving highly urgent data is required to be shortened compared to data that is transmitted and received at normal times. Consequently, how to implement optimal communication conditions depending on the type of data poses a problem. In this regard, with the technologies disclosed in Patent Literatures 1 to 5, it is difficult to implement optimal communication conditions depending on the type of data that is transmitted and received in a narrow space.

The present invention has been made in view of the above-described problems, and it is therefore an object of the present invention to provide a wireless communication system and a wireless communication method that can implement optimal communication conditions depending on the type of data.

Means of Solving the Problems

To solve the problems described above, the present inventors have invented a wireless communication system and a wireless communication method for transmitting and receiving data to and from a plurality of terminals that are for use in a narrow space. The wireless communication system has a normal transmitting/receiving means and an urgent transmitting/receiving means. The normal transmitting/receiving means transmits and receives normal data, among the data, to and from a terminal, based on the priorities assigned to each of a plurality of buffers stored in a base station. The urgent transmitting/receiving means assigns a high priority to the buffer storing the lowest amount of data among the plurality of buffers, and transmits and receives urgent data, among the data, which is different from the normal data, to and from the terminal, via the buffer where the high priority is assigned.

According to a first aspect of the present invention, a wireless communication system is a wireless communication system for transmitting and receiving data to and from a plurality of terminals that are for use in a narrow space, and includes normal transmitting/receiving means for transmitting and receiving normal data, among the data, to and from a terminal, based on priorities assigned to each of a plurality of buffers stored in a base station, and urgent transmitting/receiving means for assigning a high priority to a buffer storing a lowest amount of data among the plurality of buffers, and transmitting and receiving urgent data, among the data, which is different from the normal data, to and from the terminal, via the buffer to which the high priority is assigned.

According to a second aspect of the present invention, in the wireless communication system of the first invention, the base station has a cable transmitting/receiving unit that shares basic information, including information that is necessary for communication connection with another base station and a wireless transmitting/receiving unit that transmits and receives the data to and from the terminal.

According to a third aspect of the present invention, in the wireless communication system of the second invention, the urgent transmitting/receiving means has receiving means, whereby a plurality of base stations each receive the same urgent data and transmitting means, whereby one of the plurality of base stations transmits the urgent data to the terminal.

According to a fourth aspect of the present invention, in the wireless communication system of the second invention or the third invention, the urgent transmitting/receiving means transmits and receives the urgent data to and from the terminal using a random access scheme.

According to a fifth aspect of the present invention, in the wireless communication system of one of the first invention to the fourth invention, the data includes attribute information, which shows a type of information included in the data, and the wireless communication system further has judging means for determining whether the data transmitted and received is the normal data or the urgent data, based on the attribute information.

According to a sixth aspect of the present invention, a wireless communication system is a wireless communication method for transmitting and receiving data to and from a plurality of terminals for use in a narrow space, and has the steps of transmitting and receiving normal data, among the data, to and from a terminal, based on priorities assigned to each of a plurality of buffers stored in a base station and assigning a high priority to a buffer storing a lowest amount of data among the plurality of buffers, and transmitting and receiving urgent data, among the data, which is different from the normal data, to and from the terminal, via the buffer to which the high priority is assigned.

Effects of the Invention

According to the first to the fifth aspect of the present inventions, the normal transmitting/receiving means transmits and receives normal data based on the priorities assigned to each of a plurality of buffers. Consequently, stable communication conditions required for stable operations of manufacturing lines and/or the like can be maintained. Also, the urgent transmitting/receiving means assigns the highest priority to the buffer storing the lowest amount of data among the plurality of buffers, and transmits and receives urgent data via the buffer where the high priority is assigned. Consequently, unlike when the normal transmitting/receiving means is used, urgent data can be transmitted/received in the shortest time, regardless of what priorities are initially assigned to the buffers. By this means, it is possible to implement optimal communication conditions depending on the type of data.

In particular, according to the second aspect of the present invention, the base station has a cable transmitting/receiving unit that shares basic information with other base stations. Consequently, even when a terminal moves and goes out of the communication range of one base station, the terminal can still easily establish a communication connection with another base station. This makes it possible to continue transmitting and receiving data to and from terminals moving within a narrow space.

In particular, according to the third aspect of the present invention, the transmitting means transmits urgent data from one of a plurality of base stations to a terminal. Consequently, the base station that has established a communication connection with the terminal first can transmit urgent data. By this means, the time it takes to transmit and receive urgent data can be further reduced.

In particular, according to the fourth aspect of the present invention, the urgent transmitting/receiving means transmits and receives urgent data to and from a terminal by using a random access scheme. Consequently, among a plurality of base stations, the base station that can establish a communication connection with the terminal first can transmit and receive urgent data. By this means, the time it takes to transmit and receive urgent data can be further reduced.

In particular, according to the fifth aspect of the present invention, the judging means determines whether the data that is transmitted or received is normal data or urgent data, based on attribute information. Consequently, even when the type of data is not classified in advance, the normal transmitting/receiving means or the urgent transmitting/receiving means can be used after the type of data is determined. By this means, it is possible to easily implement optimal communication conditions depending on the type of data.

According to the sixth aspect of the present invention, the normal transmitting/receiving step transmits and receives normal data based on the priorities assigned to each of a plurality of buffers. Consequently, stable communication conditions required for stable operations of manufacturing lines and/or the like can be maintained. Also, the urgent transmitting/receiving step assigns the highest priority to the buffer storing the lowest amount of data, among the plurality of buffers, and transmits and receives urgent data via the buffer where the high priority is assigned. Consequently, unlike when the normal transmitting/receiving means is used, urgent data can be transmitted/received in the shortest time, regardless of what priorities are initially assigned to the buffers. By this means, it is possible to implement optimal communication conditions depending on the type of data.

DESCRIPTION OF THE EMBODIMENTS

Embodiment: Wireless Communication System 100

Figure 1:
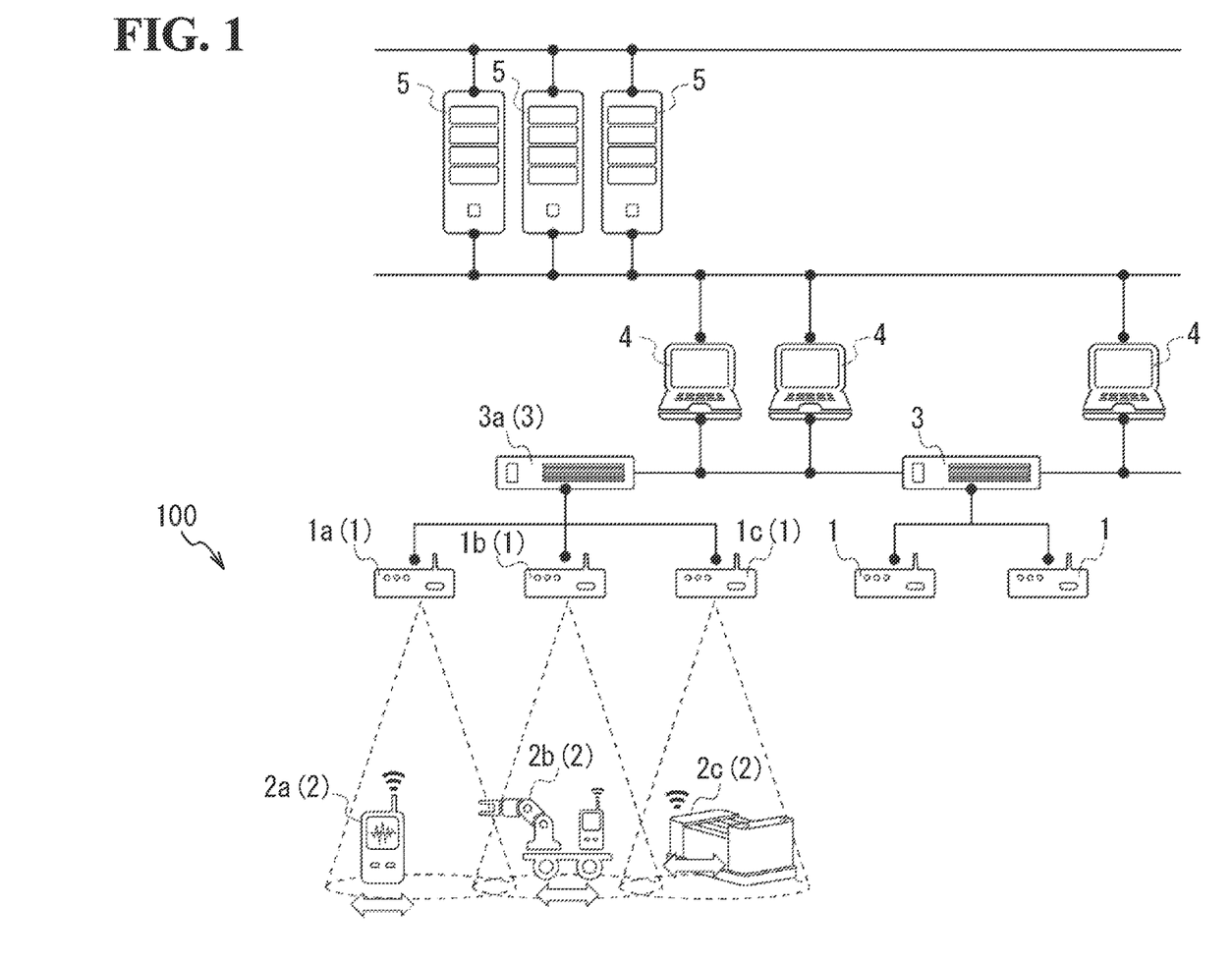
FIG. 1 is a schematic diagram to show an example of an overview of a wireless communication system according to an embodiment.

Hereinafter, a wireless communication system 100 according to an embodiment of the present invention will be described in detail. FIG. 1 is a schematic diagram to show an example of an overview of a wireless communication system 100 according to the present embodiment.

The wireless communication system 100 includes a base station 1. The wireless communication system 100 is used primarily when the base station 1 transmits and receives data D to and from a plurality of terminals 2 (terminals 2a to 2c in FIG. 1), which are for use in a narrow space, via wireless communication.

In the wireless communication system 100, any communication scheme can be used, and wireless communication can be performed between multiple terminals 2 and a base station 1 by using, for example, the orthogonal frequency-division multiple access (OFDMA: Orthogonal Frequency-Division Multiple Access) scheme, in addition to the time-division multiplexing scheme.

In the wireless communication system 100, data D to be transmitted and received is comprised of normal data (normal data Da) and urgent data (urgent data Db), and data Da and data Db are both transmitted and received in different operations. Consequently, for example, a dedicated frequency bandwidth can be reserved for normal data Da, reliably, and, furthermore, transmission/receipt of urgent data Db can be guaranteed with predetermined delays or less, or with predetermined packet loss or less. By this means, it becomes possible to achieve optimal communication conditions depending on the type of data D.

The terminals 2 may be, for example, manufacturing apparatus, automatic transport apparatus, a forklift, an inspection machine, an IoT (Internet of Things) device, a smartphone, a tablet terminal, a robot and so forth that are used in a narrow space, and may move within a narrow space, for example. As used herein, a "narrow space" refers to an area that is confined within a predetermined range, such as a manufacturing site like a factory, a distribution warehouse, a ship, a shopping mall and so forth. Priorities are assigned to the terminals 2 in advance. The priorities assigned per terminal 2 may be, for example, acquired by base stations 1 in advance, or may be included in data D that is transmitted from the terminals 2.

In the wireless communication system 100, for example, a base station 1 may transmit and receive data D, via cable communication, to and from a higher base station 3 that is connected for cable communication. The higher base station 3 may transmit and receive data D to and from, for example, a control device 4, a server 5 and so forth that are connected for cable communication. By connecting a plurality of higher base stations 3 to the base station 1, it becomes possible to transmit and receive data D to and from a plurality of terminals 2 over a wide range.

For example, data D includes attribute information that shows the types of information included in the data D. The types of attribute information include, for example, information related to control of the terminals 2, information related to safety and relief, information related to security, information related to emergency, and so forth. In the wireless communication system 100, for example, data D to include attribute information related to emergency is classified as urgent data Db, and data D to include other types of attribute information is classified as normal data Da, and, furthermore, the classifications of data Da and data Db can be configured arbitrarily, depending on the situation in which the wireless communication system 100 is used.

The wireless communication system 100 has, for example, a plurality of base stations 1 (in FIG. 1, base stations 1a to 1c) connected to one higher base station 3 (in FIG. 1, higher base station 3a), and each base station 1 may be connected with each other via cable communication. In this case, the basic information of at least two adjacent base stations 1 among a plurality of base stations 1 may be shared, and, in addition, the basic information of a plurality of base stations 1 may be gathered in the higher base station 3.

The basic information includes information related to the mode of communication connection, per base station 1. The basic information includes, for example, the number of buffers in the base station 1, the capacity and amount of data D that can be stored in each buffer (the number of queues stored in each buffer), the priority assigned to each buffer, the state of connection with the terminals 2, the frequency bandwidth required to connect with the terminals 2, the period for storing data D on a temporary basis, and the priorities and identification information of the connecting terminals 2. Note that the timing for sharing the basic information may be controlled by each base station 1, or may be controlled, for example, by the higher base station 3. In this case, the higher base station 3 acquires the basic information of each base station 1 in a predetermined cycle.

Sharing of basic information among a plurality of base stations 1 can be realized using known protocols such as SOAP (Simple Object Access Protocol), REST (REpresentational State Transfer) API, and so forth. Note that, by synchronizing the time between a plurality of base stations 1, information related to the reservation and release of the frequency bandwidth required to connect with terminals 2 can be shared.

Base Station 1

Figure 2:
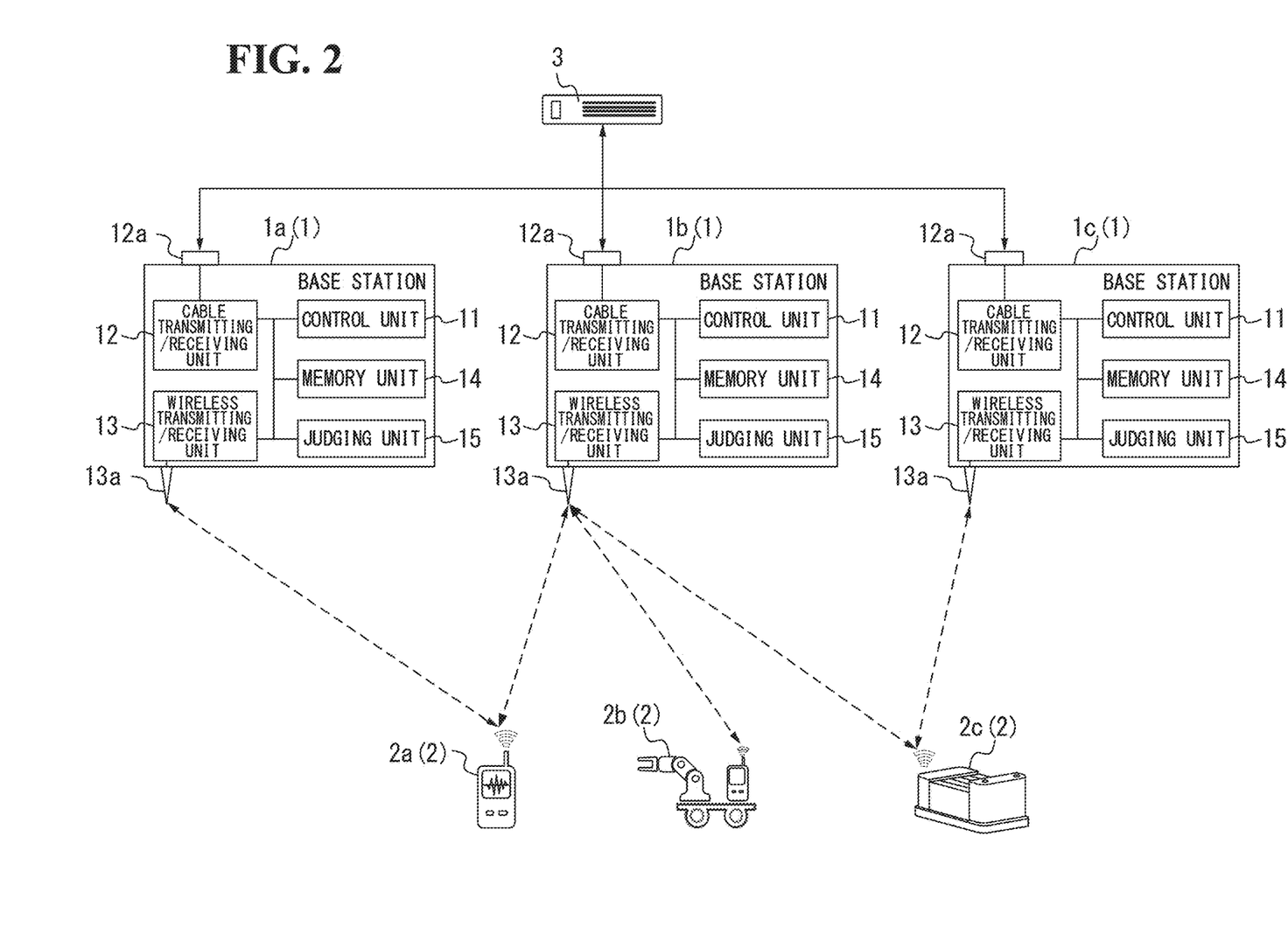
FIG. 2 is a schematic diagram to show an example of the structure of a base station.

A base station 1 includes, for example, as shown in FIG. 2, a control unit 11, a cable transmitting/receiving unit 12, a cable port 12a, a wireless transmitting/receiving unit 13, an antenna 13a, and a memory unit 14, and includes, for example, a judging unit 15. Each configuration is connected by an internal bus. Note that, when a plurality of base stations 1 are provided, they are all configured alike.

The control unit 11 controls the whole of the base station 1, and controls, for example, operations related to the transmission and receipt of data D. The control unit 11 controls, for example, the method of storing data D that is received, the method of transmission and receipt, and so on. For example, a processor such as a CPU (Central Processing Unit) is used for the control unit 11.

The cable transmitting/receiving unit 12 transmits and receives data D to and from, for example, at least one of a higher base station 3 and another base station 1. The cable transmitting/receiving unit 12 transmits and receives the basic information to and from, for example, at least one of the higher base station 3 and another base station 1. Consequently, the base station 1 can share the basic information with at least one of the higher base station 3 and another base station 1.

The cable transmitting/receiving unit 12 performs cable communication via a cable port 12a (the solid arrows in FIG. 2). The cable port 12a is an interface for performing cable communication with the higher base station 3, another base station 1 and/or others. A cable that is in the public domain, such as a LAN cable, is connected to the cable port 12a.

The wireless transmitting/receiving unit 13 transmits and receives data D to and from the terminals 2. The wireless transmitting/receiving unit 13 performs wireless communication via an antenna 13a (the dotted arrows in FIG. 2). The antenna 13a is used to perform wireless communication with the terminals 2. For wireless communication, for example, a license-free frequency bandwidth (for example, ISM (Industry Science Medical) band) is used.

The memory unit 14 stores the data D and the like received from the terminals 2 and the higher base station 3. For the memory unit 14, for example, a data storage device that is in the public domain is used, such as an SSD (Solid State Drive), apart from an HDD (Hard Disk Drive). The memory unit 14 includes a RAM (Random Access Memory) and a ROM (Read Only Memory), for example, and stores programs and/or the like that are run by the base station 1. Note that each function implemented on the base station 1 is implemented when the control unit 11 runs programs stored in the memory unit 14, using the RAM for the work area.

The judging unit 15 judges whether data D is normal data Da or urgent data Db, based on the attribute information included in the data D, for example. For example, the judging unit 15 determines the type of data D with reference to an attribute information table stored in the memory unit 14. Note that, for example, when the base station 1 does not have the judging unit 15, the base station 1 may be able to identify the type of data D by receiving information for identifying either normal data Da or urgent data Db shortly before.

Figure 3A:
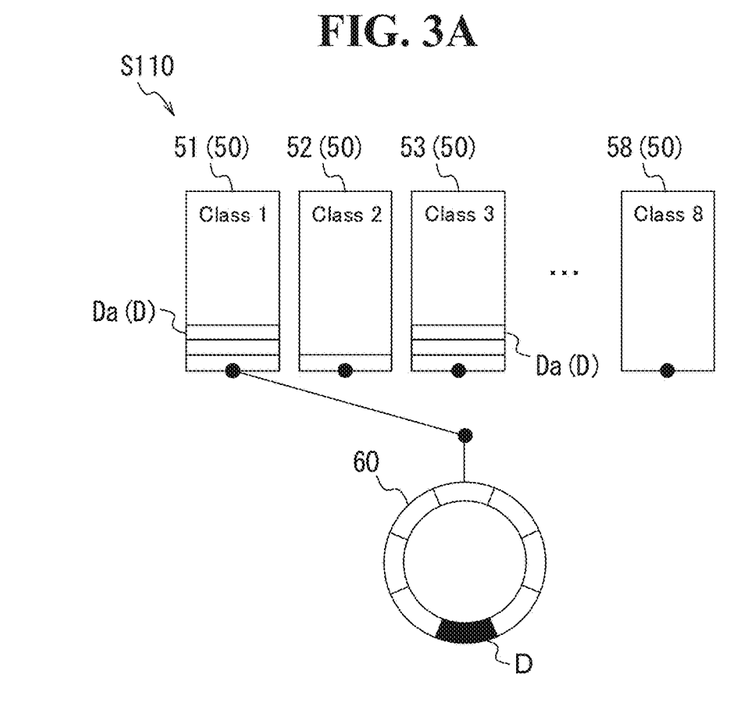
FIGS. 3A and 3B are schematic diagrams to show examples of the operation of a wireless communication system.
Figure 3B:
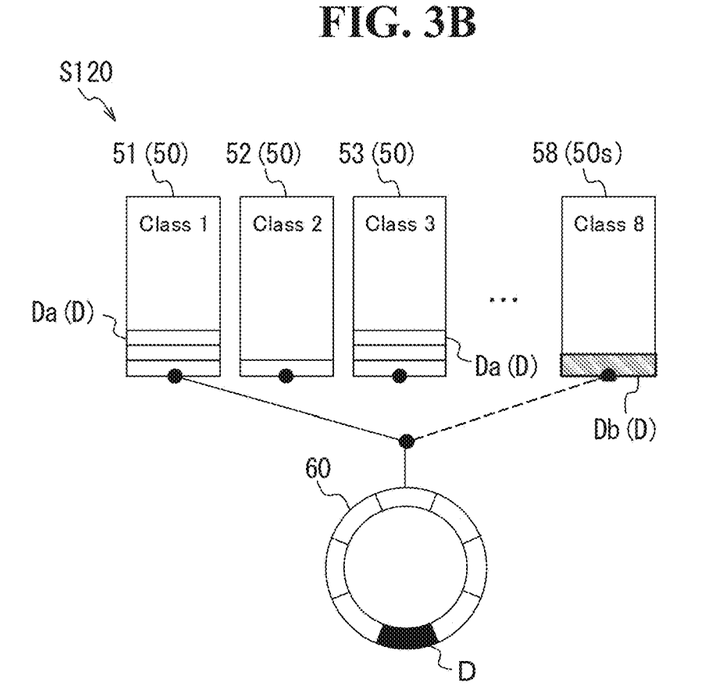

For example, as shown in FIG. 3, the memory unit 14 may store a plurality of buffers 50 (eight buffers 51 to 58, in FIG. 3), and, in addition, store queues 60 (for example, ring buffers), for example. The buffer 50 stores the data D received from the terminals 2 or the higher base station 3 on a temporary basis. The buffer 50 transmits and receives the data D to and from the terminals 2 via, for example, the queues 60.

When the queues 60 acquire data D from the buffer 50, the queues 60 store the data D on a temporary basis, and then transmit the data D to the terminals 2. Also, when the queues 60 acquire data D from the terminals 2, the queues 60 store the data D on a temporary basis, and then transmit the data D to one of the plurality of buffers 50. Note that the data D stored in each buffer 50 and the data D stored in the queues 60 are, for example, not interchangeable, and output in the order they were stored.

The number, capacity and so forth of buffers 50 and queues 60 to be configured are determined based on the basic information, for example. At least part of the basic information may be, for example, stored in the memory unit 14 in advance, or may be, for example, included in each data D. For example, the basic information may be extracted based on a model that is learned based on old data D.

The control unit 11 can check the amount of data D stored in each buffer 50 (which may be, for example, the length of queues accumulated, the number of queues, etc.) at arbitrary intervals, and assign (change) the priority of each buffer 50 as necessary. Consequently, the operation of the wireless communication system 100 (described later) can be carried out smoothly.

Embodiment: Operation of Wireless Communication System 100

Next, the operation of the wireless communication system 100 according to the present embodiment will be described. The wireless communication system 100 has a normal transmitting/receiving means S110 and an urgent transmitting/receiving means S120.

The normal transmitting/receiving means S110 and the urgent transmitting/receiving means S120 are different in two aspects: the type of data D to transmit/receive is different; and assignment of priority to designated buffers 50 is different.

Normal Transmitting/Receiving Means S110

The normal transmitting/receiving means S110 transmits and receives normal data Da to and from a terminal 2 based on priorities assigned per buffer 50. For example, as shown in FIG. 3A, a priority is assigned to each of the buffers 51 to 58 individually, and, in buffers 50 having priorities to match the priority assigned to the terminal 2 that has transmitted the normal data Da, the normal data Da is exchanged with the queues 60. For example, normal data Da that is generated and transmitted from a terminal 2, where priority 1 is assigned, is stored in the buffer 51 to which priority 1 is assigned.

Note that the priorities to be assigned to the buffers 50 may be assigned in advance by the administrator or the like, or may be assigned based on basic information, for example.

Figure 4A:
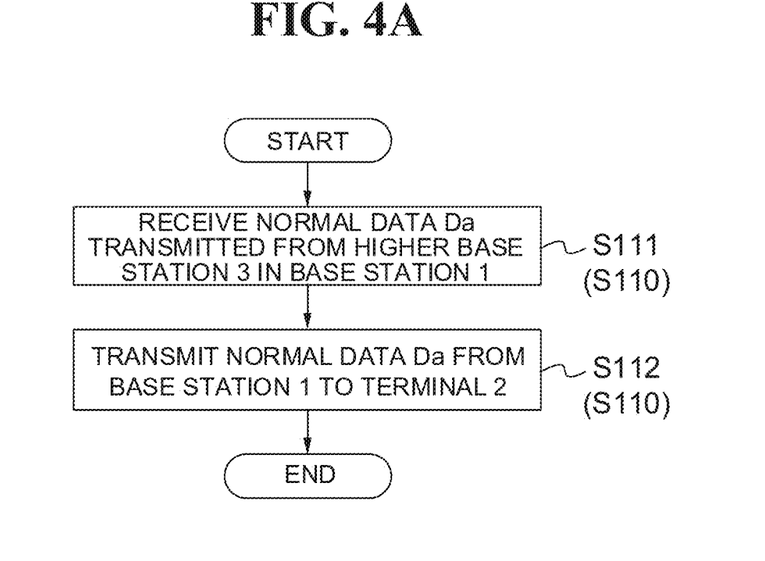
FIGS. 4A to 4D are flowcharts to show examples of the operation of a wireless communication system.

As shown in FIG. 4A, the normal transmitting/receiving means S110 includes, for example, a first normal receiving means S111 and a first normal transmitting means S112. In this case, normal data Da is transmitted from a higher base station 3 to a terminal 2 via a base station 1.

The first normal receiving means S111 receives normal data Da transmitted from the higher base station 3, in the base station 1. For example, a cable transmitting/receiving unit 12 receives the normal data Da from the higher base station 3, via cable communication.

The first normal transmitting means S112 transmits normal data Da from the base station 1 to the terminal 2. For example, the control unit 11 designates a buffer 50 with a high priority, among a plurality of buffers 50, and stores the received normal data Da in the designated buffer 50. After that, the control unit 11 transfers the normal data Da from the buffer 50 to the queues 60, for example, and transmits the normal data Da to the terminal 2 via a wireless transmitting/receiving unit 13. By this means, the terminal 2 receives the normal data Da. In this case, the base station 1 and the terminal 2 are connected using, for example, a random access scheme.

By this means, the transmission of normal data Da from the higher base station 3 to the terminal 2 via the base station 1 is finished.

Figure 4B:
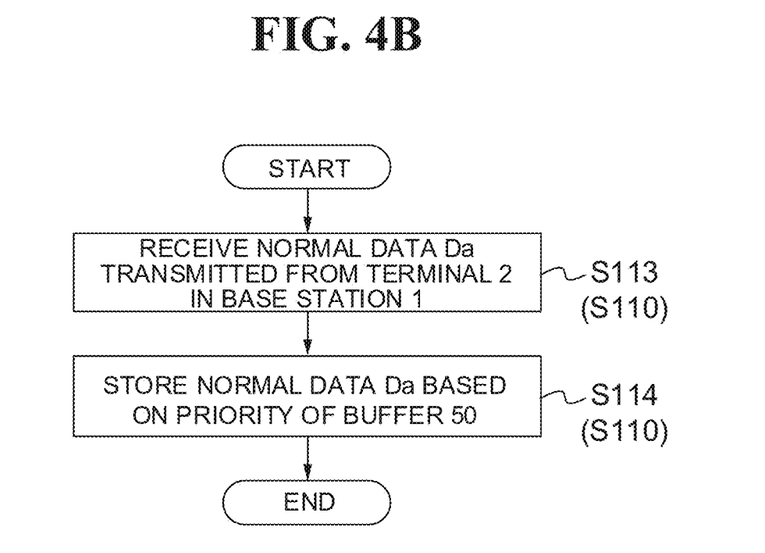

As shown in FIG. 4B, for example, the normal transmitting/receiving means S110 may include a second normal receiving means S113 and a normal storage means S114, and may include, for example, a second normal transmitting means. In this case, normal data Da may be transmitted from the terminal 2 to the base station 1, and the normal data Da may be, for example, transmitted to the higher base station 3 via the base station 1.

The second normal receiving means S113 receives the normal data Da transmitted from the terminal 2, in the base station 1. For example, the wireless transmitting/receiving unit 13 receives the normal data Da from the terminal 2, via wireless communication. In this case, the base station 1 and the terminal 2 are connected using, for example, a random access scheme.

The normal storage means S114 stores the normal data Da based on the priorities of the buffers 50. For example, the control unit 11 stores the received normal data Da in the queues 60. After that, the control unit 11 designates buffers 50, where priorities to match the priority of the terminal 2 that has transmitted the normal data Da stored in the queues 60 are assigned, and stores the normal data Da in the designated buffers 50.

By this means, normal data Da is transmitted from the terminal 2 to the base station 1 and stored in buffers 50. After that, for example, when the second normal transmitting means is activated, the control unit 11 transmits the normal data Da stored in the buffers 50, to the higher base station 3, via the cable transmitting/receiving unit 12. By this means, the transmission of normal data Da from the terminal 2 to the higher base station 3 via the base station 1 is finished.

Urgent Transmitting/Receiving Means S120

The urgent transmitting/receiving means S120 assigns a high priority to the buffer storing the lowest amount of data D among a plurality of buffers 50, and transmit and receive urgent data Db via the buffer 50 to which the high priority is assigned. For example, as shown in FIG. 3B, in the buffer 50 (buffer 50s in FIG. 3B) storing the lowest amount of data D (the buffer 50 to store the lowest number of queues) among the buffers 51 to 58, the urgent data Db is exchanged with the queues 60. At this time, after checking the state of queues accumulated in the buffers 51 to 58, the urgent data Db is stored in the buffer 50s where the lowest amount of data D is stored, and the highest priority is assigned to the buffer 50s. Consequently, regardless of the priorities assigned per buffer 50 in advance, the buffer 50s storing the lowest amount of data D can preferentially exchange the urgent data Db with the queues 60. Consequently, the time it takes to transmit and receive data D can be reduced in the urgent transmitting/receiving means S120 compared to the normal transmitting/receiving means S110.

Note that the priority assigned to the buffer 50s is changed to the priority that is assigned in advance, after the transmission/receipt of urgent data Db is finished. Consequently, for example, after the urgent transmitting/receiving means S120 is implemented, the normal transmitting/receiving means S110 can be implemented smoothly.

Note that the urgent transmitting/receiving means S120 may store, for example, a plurality of items of urgent data Db of the same content in the buffer 50s, and transmit and receive these to and from the terminal 2. Furthermore, a plurality of items of urgent data Db of the same content may be transmitted from a plurality of terminals 2 to the base station 1. In these cases, the number of items of urgent data Db to transmit and receive can be configured so as to ensure redundancy, so that it is possible to guarantee keeping the packet loss rate, required depending on the situation, at a certain level or lower.

Figure 4C:
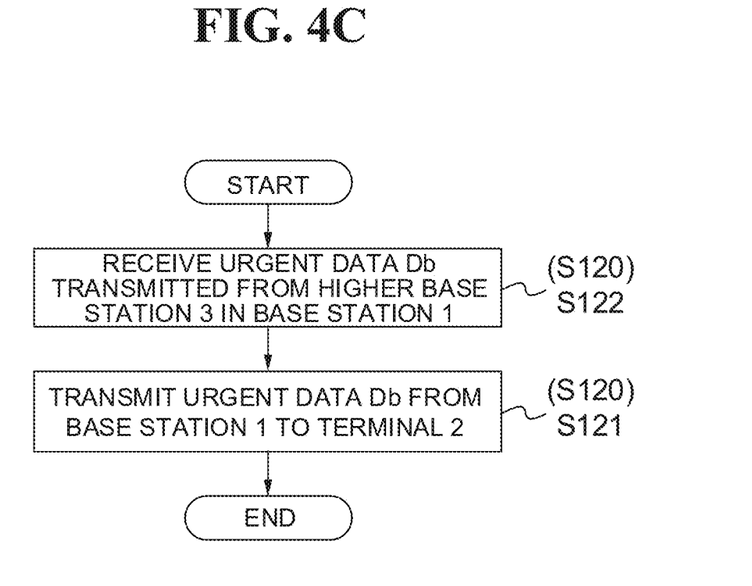

As shown in FIG. 4C, the urgent transmitting/receiving means S120 includes, for example, a first urgent receiving means S121 and a first urgent transmitting means S122. In this case, urgent data Db is transmitted from a higher base station 3 to a terminal 2 via a base station 1.

The first urgent receiving means S121 receives urgent data Db transmitted from the higher base station 3, in the base station 1. For example, a cable transmitting/receiving unit 12 receives the urgent data Db from the higher base station 3, via cable communication.

The first urgent transmitting means S122 transmits the urgent data Db from the base station 1 to the terminal 2. For example, the control unit 11 designates the buffer 50s storing the lowest amount of data D among a plurality of buffers 50, and stores the received urgent data Db in that buffer 50s. At this time, the highest priority is assigned to the buffer 50s. The control unit 11 transfers the urgent data Db from the buffer 50s to the queues 60, for example, and transmits the urgent data Db to the terminal 2 via a wireless transmitting/receiving unit 13. By this means, the terminal 2 receives the urgent data Db. In this case, the base station 1 and the terminal 2 are connected using, for example, a random access scheme.

By this means, the transmission of urgent data Db from the higher base station 3 to the terminal 2 via the base station 1 is finished. Note that, after the transmission/receipt of urgent data Db is finished, the control unit 11 changes the priority assigned to the buffer 50s to the priority that is assigned in advance.

Figure 4D:
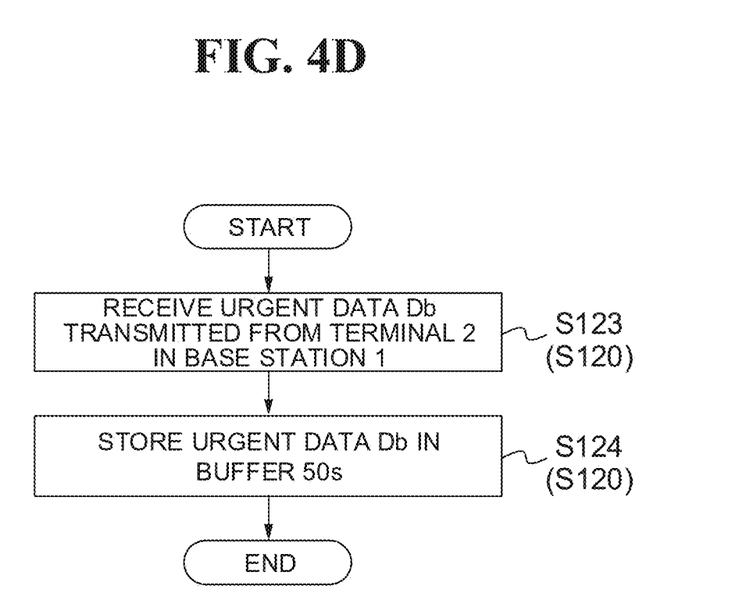

As shown in FIG. 4D, for example, the urgent transmitting/receiving means S120 may include a second urgent receiving means S123 and an urgent storage means S124, and may include, for example, a second urgent transmitting means. In this case, urgent data Db may be transmitted from the terminal 2 to the base station 1, and the urgent data Db may be transmitted to the higher base station 3 via the base station 1.

The second urgent receiving means S123 receives the urgent data Db transmitted from the terminal 2, in the base station 1. For example, the wireless transmitting/receiving unit 13 receives the urgent data Db from the terminal 2, via wireless communication. In this case, the base station 1 and the terminal 2 are connected using, for example, a random access scheme.

The urgent storage means S124 stores the urgent data Db in the buffer 50s storing the lowest amount of data D among a plurality of buffers 50. For example, the control unit 11 stores the received urgent data Db in the queues 60. After that, the control unit 11 designates the buffer 50s storing the lowest amount of data D among a plurality of buffers 50, and assigns the highest priority to the buffer 50s. After that, the urgent data Db stored in the queues 60 is stored in the buffer 50s.

By this means, urgent data Db is transmitted from the terminal 2 to the base station 1 and stored in the buffer 50s. After that, for example, when the second urgent transmitting means is activated, the control unit 11 transmits the urgent data Db stored in the buffer 50s, to the higher base station 3, via the cable transmitting/receiving unit 12. By this means, the transmission of urgent data Db from the terminal 2 to the higher base station 3 via the base station 1 is finished. Note that, after the transmission/receipt of urgent data Db is finished, the control unit 11 changes the priority assigned to the buffer 50s to the priority that is assigned in advance.

Judging Means S130

The wireless communication system 100 may have, for example, a judging means S130. The judging means S130 determines whether data D that is transmitted and received is normal data Da or urgent data Db, based on the attribute information included in the data D. The judging means S130 is implemented, for example, when data D includes attribute information, or when the contents of data D are not notified in advance.

Figure 5A:
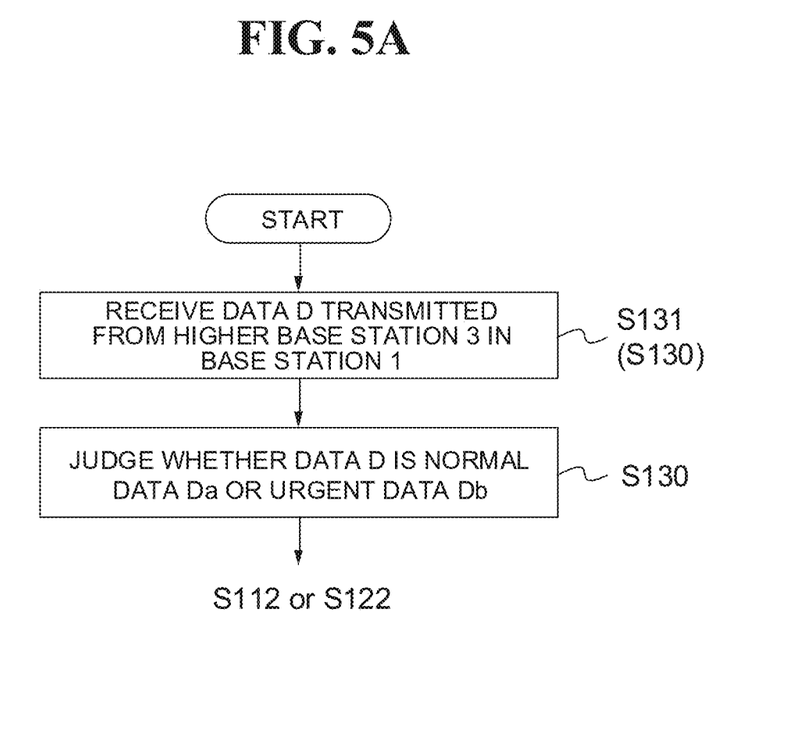
FIGS. 5A and 5B are flowcharts to show examples of a judging means.

As shown in FIG. 5A, for example, the judging means S130 has a first receiving means S131. The first receiving means S131 receives data D transmitted from the higher base station 3, in the base station 1. For example, a cable transmitting/receiving unit 12 receives data D from the higher base station 3, via cable communication. After that, the judging unit 15 determines the type of the data D, and implements the first normal transmitting means S112 or the first urgent transmitting means S122, based on the result of the determination.

By this means, the transmission of normal data Da or urgent data Db from the higher base station 3 to the terminal 2 via the base station 1 is finished.

Figure 5B:
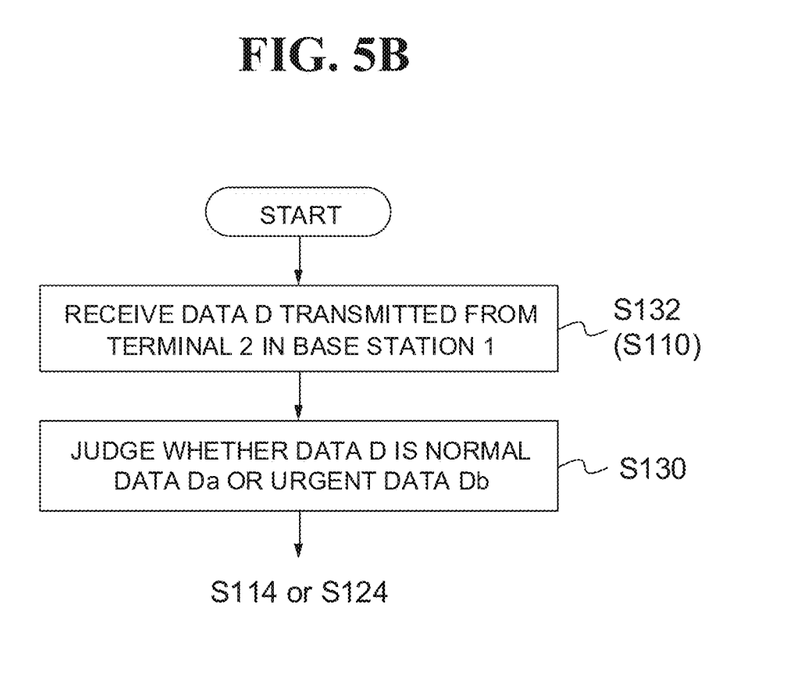

As shown in FIG. 5B, for example, the judging means S130 has a second receiving means S132. The second receiving means S132 receives the data D transmitted from the terminal 2, in the base station 1. For example, the wireless transmitting/receiving unit 13 receives the data D from the terminal 2, via wireless communication. After that, the judging unit 15 determines the type of data D, and implements the normal storage means S114 or the urgent storage means S124 based on the result of the determination.

By this means, normal data Da or urgent data Db is transmitted from the terminal 2 to the base station 1 and stored in the buffer 50, and, based on the situation, the transmission of normal data Da or urgent data Db to the higher base station 3 is finished.

Embodiment: Example Variation of Operation of Wireless Communication System 100

Next, an example of a variation of the wireless communication system 100 according to the present embodiment will be described below. This example variation is different from the above-described example of the operation in having a plurality of base stations 1. Note that the description of the same contents as in the operation of the above-described wireless communication system 100 will be omitted.

Figure 6:
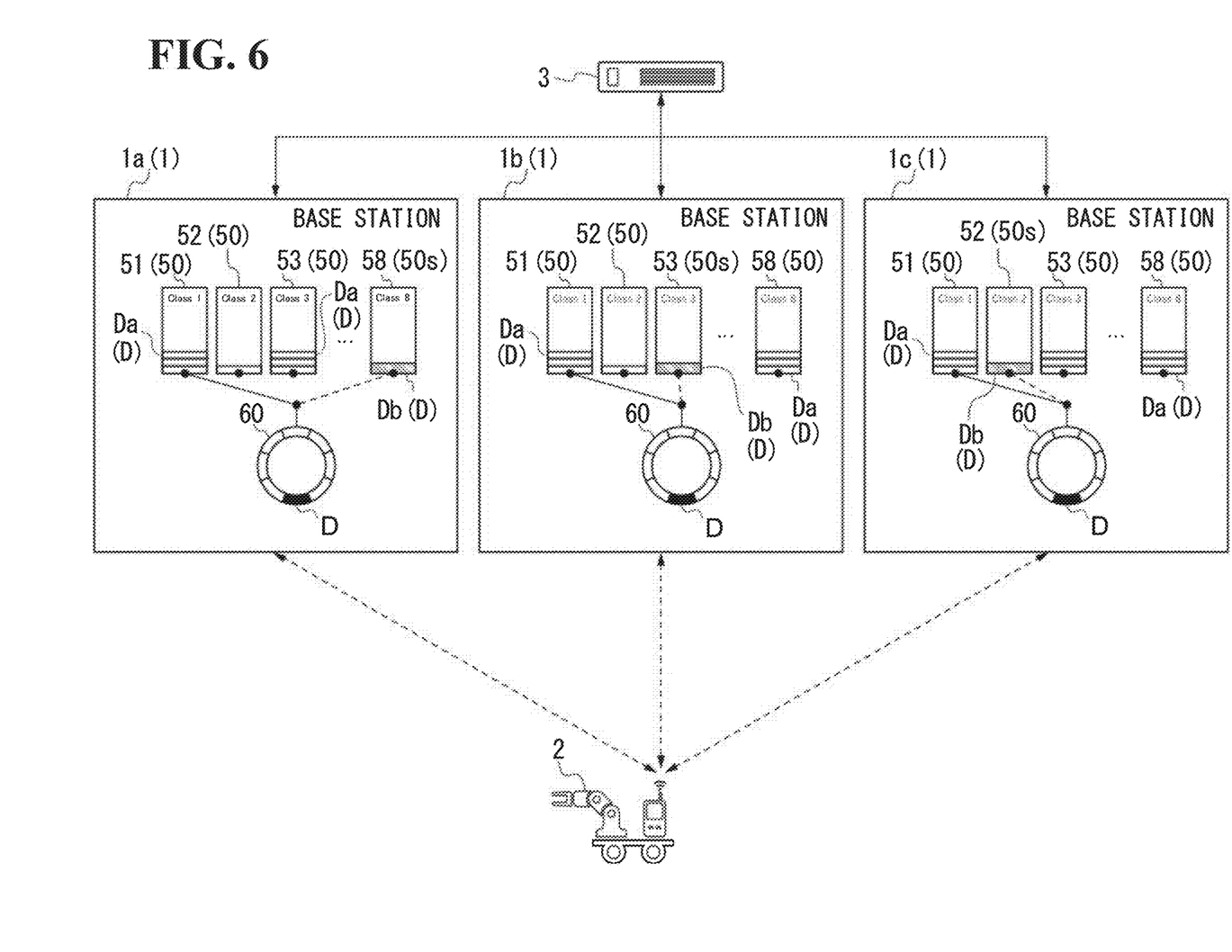
FIG. 6 is a flowchart to show an example of a variation of the operation of a wireless communication system.

As shown in FIG. 6, for example, the wireless communication system 100 according to this example variation is used in a state in which a plurality of base stations 1 can transmit and receive data D depending on the location of a terminal 2. In this case, for example, the base stations 1 share the basic information with each other. The base stations 1 sharing the basic information are connected with, for example, a common higher base station 3. Note that the wireless communication system 100 according to this example variation only needs to assume a state in which, for example, at least two adjacent base stations 1 among a plurality of base stations 1 share the basic information with each other.

In the wireless communication system 100 of the example variation, the number of buffers 50 in each base station 1 and the capacity of each buffer 50 are configured based on the basic information shared by each base station 1, and then traffic is allocated, so that communication paths are configured between each base station 1 and the terminal 2. At this point, priorities may be assigned per buffer 50, for example.

In the wireless communication system 100 of the example variation, at least one of a plurality of base stations 1 transmits and receives data D to and from one terminal 2 with the normal transmitting/receiving means S110 and the urgent transmitting/receiving means S120. In this case, wireless communication between the terminal 2 and each base station 1 is performed using, for example, a random access scheme, and the base station 1 that is connected first transmits and receives data D to and from the terminal 2.

With the normal transmitting/receiving means S110, for example, when the first normal receiving means S111 shown in FIG. 4A is implemented, the normal data Da that is transmitted from the higher base station 3 may be received in one base station 1, or may be received in a plurality of base stations 1, for example. In this case, with the first normal transmitting means S112, the base station 1 that has first connected with the terminal 2 transmits the normal data Da to the terminal 2.

Also, with the normal transmitting/receiving means S110, for example, when implementing the second normal receiving means S113 shown in FIG. 4B, the base station 1 that has first connected with the terminal 2 receives the normal data Da from the terminal 2. After that, the above-described normal storage means S114 is implemented.

With the urgent transmitting/receiving means S120, for example, when implementing the first emergency receiving means S121 shown in FIG. 4C, the same urgent data Db as that transmitted from the higher base station 3 is received in a plurality of base stations 1 that are connected with the higher base station 3 for communication (see, for example, FIG. 6). Next, the first urgent transmitting means S122 (transmitting means) stores urgent data Db in the buffer 50s storing the lowest amount of data D among a plurality of buffers 50, per base station 1. Then, the highest priority is assigned to the buffer 50s per base station 1. After that, one of the plurality of base stations 1 transmits urgent data Db to the terminal 2. For example, the base station 1 that has first established a communication connected with the terminal 2 transmits the urgent data Db to the terminal 2. Consequently, the time it takes to transmit and receive the urgent data Db can be reduced compared to when the urgent data Db is transmitted to the terminal 2 from one base station 1.

With the urgent transmitting/receiving means S120, for example, when implementing the second urgent receiving means S123 shown in FIG. 4D, the base station 1 that has first connected with the terminal 2 receives the urgent data Db from the terminal 2. Next, the above-described urgent storage means S124 may be implemented, and, for example, the above-described second urgent transmitting means may be implemented. Consequently, the time it takes to transmit and receive the urgent data Db can be reduced compared to when the urgent data Db is transmitted from the terminal 2 to the higher base station 3 via one base station 1.

Note that, in the urgent transmitting/receiving means S120, for example, when the free capacity in the buffers 50 in the base station 1 that has first connected with the terminal 2 is small, the urgent data Db may be stored in another base station 1. In this case, the base station 1 with little free capacity in the buffers 50 rejects the urgent data Db transmitted from the terminal 2, and allows another base station 1 to connect with the terminal 2. In addition to the above, for example, urgent data Db may be received, and then transmitted to another base station 1 via cable communication. These make it possible to reduce the time it takes to transmit packets.

Note that, with the judging means S130, the same operation as described above can be implemented per base station 1.

According to the present embodiment, the normal transmitting/receiving means S110 transmits and receives normal data Da based on the priorities assigned to each of a plurality of buffers 50. Consequently, stable communication conditions required for stable operations of manufacturing lines and/or the like can be maintained. Also, the urgent transmitting/receiving means S120 assigns the highest priority to the buffer 50s storing the lowest amount of data D, among a plurality of buffers 50, and transmits and receives urgent data Db via the buffer 50s to which the high priority is assigned. Consequently, unlike when the normal transmitting/receiving means S110 is used, urgent data Db can be transmitted/received in the shortest time, regardless of what priorities are initially assigned to the buffers 50. By this means, it is possible to implement optimal communication conditions depending on the type of data D.

In particular, according to the present embodiment, the base station 1 has a cable transmitting/receiving unit 12 that shares basic information with other base stations 1. Consequently, even when a terminal 2 moves out of the communication range of one base station 1, the terminal 2 can still easily establish a communication connection with other base stations 1. By this means, it is possible to continue transmitting and receiving data D to and from the terminal 2 that moves within a narrow space.

Furthermore, according to the present embodiment, with the transmitting means (first urgent transmitting means S122), urgent data Db is transmitted from one of a plurality of base stations 1 to the terminal 2. Consequently, the base station 1 that has established a communication connection with the terminal 2 first can transmit the urgent data Db. By this means, the time it takes to transmit and receive the urgent data Db can be further reduced.

Furthermore, according to the present embodiment, the urgent transmitting/receiving means S120 transmits and receives urgent data Db to and from the terminal 2 using a random access scheme. Consequently, among a plurality of base stations 1, the base station 1 that can establish a communication connection with the terminal 2 first can transmit and receive the urgent data Db. By this means, the time it takes to transmit and receive the urgent data Db can be further reduced.

Furthermore, according to the present embodiment, the judging means S130 determines whether data D that is transmitted and received is normal data Da or urgent data Db, based on attribute information. Consequently, even when the type of data D is not classified in advance, it is possible to determine the type of data D and use the normal transmitting/receiving means S110 or the urgent transmitting/receiving means S120. By this means, it is possible to implement optimal communication conditions depending on the type of data D.

Note that, with the communication method according to the present embodiment, it is possible to implement optimal communication conditions, depending on the type of data D, as in the details described above, by having a normal transmitting/receiving step and an urgent transmitting/receiving step, instead of the normal transmitting/receiving means S110 and the urgent transmitting/receiving means S120 described above.

In addition, the wireless communication method according to the present embodiment can achieve the above-described effects by additionally having each step, instead of each means described above.

DESCRIPTION OF THE REFERENCE NUMERAL

1: base station
2: terminal
3: higher base station
4: control device
5: server
11: control unit
12: cable transmitting/receiving unit
12a: cable port
13: wireless transmitting/receiving unit
13a: antenna
14: memory unit
15: judging unit
50: buffer
60: queue
100: wireless communication system
S110: normal transmitting/receiving means
S120: urgent transmitting/receiving means
S130: judging means

What is claimed is:

1. A wireless communication system comprising:
a base station storing a plurality of buffers; and
a plurality of terminals to and from which data is transmitted and received by the base station, the data comprising attribute information showing a type of information included in the data, among a plurality of types of information, the types of information including at least information related to control of the terminals and information related to urgency,
wherein the base station is configured to:
determine whether received data is normal data or urgent data, based on the attribute information included in the received data;
in response to determining that the received data is the normal data, transmit and receive the normal data to and from a terminal, based on priorities assigned in advance to each of the plurality of buffers stored in the base station; and
in response to determining that the received data is the urgent data, assign a high priority to a buffer storing a lowest amount of data among the plurality of buffers, transmit and receive the urgent data, which is different from the normal data, to and from the terminal using a random access scheme, via the buffer to which the high priority is assigned, and change the priorities assigned to each of the plurality of buffers to the priorities assigned in advance after the transmitting and receiving of the urgent data is finished.

2. The wireless communication system according to claim 1, wherein the base station is further configured to:
share basic information, including information that is necessary for communication connection with another base station, via a cable connection; and
transmit and receive the data to and from the terminal via wireless communication.

3. The wireless communication system according to claim 2, wherein:
the wireless communication system comprises a plurality of base stations;
each of the plurality of base stations receives same urgent data; and
one of the plurality of base stations transmits the urgent data to the terminal.

4. A wireless communication method comprising:
determining whether received data is normal data or urgent data, based on attribute information included in the received data, the attribute information showing a type of information included in the received data among a plurality of types of information, the types of information including at least information related to control of a terminal and information related to urgency;

in response to determining that the received data is the normal data, transmitting and receiving the normal data to and from the terminal, based on priorities assigned in advance to each of a plurality of buffers stored in a base station; and in response to determining that the received data is the urgent data, assigning a high priority to a buffer storing a lowest amount of data among the plurality of buffers, transmitting and receiving urgent data, which is different from the normal data, to and from the terminal using a random access scheme, via the buffer to which the high priority is assigned, and changing the priorities assigned to each of the plurality of buffers to the priorities assigned in advance after the transmitting and receiving of the urgent data is finished.

\* \* \* \* \*